US008922723B2

(12) United States Patent
Kakinuma et al.

(10) Patent No.: US 8,922,723 B2
(45) Date of Patent: Dec. 30, 2014

(54) OPTICAL DEVICE

(75) Inventors: Akira Kakinuma, Osaka (JP); Keisuke Yoneda, Osaka (JP); Fumio Kato, Osaka (JP)

(73) Assignee: Panasonic Corporation, Osaka (JP)

( * ) Notice: Subject to any disclaimer, the term of this patent is extended or adjusted under 35 U.S.C. 154(b) by 173 days.

(21) Appl. No.: 13/807,913

(22) PCT Filed: Jun. 3, 2011

(86) PCT No.: PCT/JP2011/003153
§ 371 (c)(1),
(2), (4) Date: Dec. 31, 2012

(87) PCT Pub. No.: WO2012/001880
PCT Pub. Date: Jan. 5, 2012

(65) Prior Publication Data
US 2013/0100363 A1    Apr. 25, 2013

(30) Foreign Application Priority Data

Jun. 30, 2010   (JP) .................................. 2010-148566

(51) Int. Cl.
| G02F 1/1335 | (2006.01) |
| G02B 27/22  | (2006.01) |
| H04N 13/04  | (2006.01) |
| G02F 1/13   | (2006.01) |

(52) U.S. Cl.
CPC ........ *G02B 27/2228* (2013.01); *H04N 13/0438* (2013.01); *G02F 1/1313* (2013.01); *G02B 27/2264* (2013.01); *H04N 2213/008* (2013.01)
USPC .......................................................... 349/13

(58) Field of Classification Search
USPC .......................................................... 349/13
See application file for complete search history.

(56) References Cited

U.S. PATENT DOCUMENTS

| 5,635,948 A | 6/1997 | Tonosaki |
| 5,923,869 A | 7/1999 | Kashiwagi et al. |

(Continued)

FOREIGN PATENT DOCUMENTS

| CN | 201323726 Y | 10/2009 |
| JP | 07-294844 A | 11/1995 |

(Continued)

OTHER PUBLICATIONS

Japanese Office Action issued in corresponding Japanese Application No. 2012-522436, dated Apr. 3, 2014.

(Continued)

*Primary Examiner* — Timothy L Rude
(74) *Attorney, Agent, or Firm* — McDermott Will & Emery LLP

(57) ABSTRACT

Disclosed is an optical device which includes: an optical component configured to be electrically actuated such that a light transmission state is variable; a driver circuit for the optical component; a power source unit for driving the optical component; a rim for supporting the optical component; a temple having front and rear ends and connected at the front end to the rim; and an earpiece formed at the rear end of the temple. The power source unit includes a secondary battery, a power switch, a power switch control portion, and a use-status sensing portion for sensing the status of use by a user of the optical device. The power switch control portion performs control to turn off the power switch when the use-status sensing portion does not sense any use by the user of the optical device.

13 Claims, 8 Drawing Sheets

(56) References Cited

U.S. PATENT DOCUMENTS

| | | |
|---|---|---|
| 6,051,720 A | 4/2000 | Geibel et al. |
| 8,233,102 B2 * | 7/2012 | Burlingame et al. ........... 349/13 |
| 2008/0180630 A1 | 7/2008 | Clarke et al. |
| 2009/0154720 A1 | 6/2009 | Oki |
| 2009/0161066 A1 | 6/2009 | Blum et al. |

FOREIGN PATENT DOCUMENTS

| | | |
|---|---|---|
| JP | 07-318871 A | 12/1995 |
| JP | 09-005674 A | 1/1997 |
| JP | 2004-045831 A | 2/2004 |
| JP | 2004-096224 A | 3/2004 |
| JP | 2005-070671 A | 3/2005 |
| JP | 2007-037738 A | 2/2007 |
| JP | 2009-152666 A | 7/2009 |
| JP | 2009-540386 A | 11/2009 |
| JP | 2010-020898 A | 1/2010 |
| JP | 2010-022067 A | 1/2010 |
| JP | 2010-517082 A | 5/2010 |
| JP | 2010-522903 A | 7/2010 |
| WO | WO-2005/022237 A1 | 3/2005 |

OTHER PUBLICATIONS

International Search Report issued in International Patent Application No. PCT/JP2011/003153 dated Aug. 16, 2011.

Chinese Office Action issued in Chinese Patent Application No. 201180030457.1 mailed Jul. 22, 2014.

* cited by examiner

OPTICAL DEVICE

RELATED APPLICATIONS

This application is the U.S. National Phase under 35 U.S.C. §371 of International Application No. PCT/JP2011/003153, filed on Jun. 3, 2011, which in turn claims the benefit of Japanese Application No. 2010-148566 filed on Jun. 30, 2010, the disclosures of which Applications are incorporated by reference herein.

TECHNICAL FIELD

The present invention relates to optical devices, more specifically to a technology for extending the service life of a head-worn optical device to be worn on the head of a user.

BACKGROUND ART

Some stereoscopic image viewing devices (simply referred to below as viewing devices) generally called 3D eyeglasses or 3D glasses support active system and some support passive system.

In the active system, a right-eye image and a left-eye image are displayed on a display device, such as a television, while being alternatingly switched therebetween. On the other hand, on a viewing device, liquid crystal shutters or suchlike disposed on right and left lens portions are alternatingly opened/closed in synchronization with switching of images on the display device (see Patent Literatures 1 and 2).

Display devices used with the active system are structured approximately in the same manner as conventional display devices. In addition, simply using stereoscopic image data as image data to be displayed on the display devices allows stereoscopic image viewing.

On the other hand, in the passive system, right-eye and left-eye images are simultaneously displayed line-by-line on the display device, and in the display device, a polarizing filter sorts the images for the right eye and the left eye. Then, the sorted images are respectively delivered to the right eye and the left eye through specialized eyeglasses. Accordingly, in the passive system, 3D images in some cases could not be properly viewed unless the images are viewed generally in front of the display device. Moreover, since the right-eye and left-eye images are displayed on one screen at the same time, the resolution is low. Therefore, for viewing on a household television, the active stereoscopic image viewing system is preferable for users.

However, in the active system, the viewing device is required to include liquid crystal shutters and a power source for driving them, so that the viewing device becomes heavier and bulkier than normal eyeglasses. Therefore, many users feel discomfort with wearing the viewing device.

Accordingly, active stereoscopic image viewing systems are desired to have lighter viewing devices for improved comfort of wearing. Currently, it is the mainstream practice to use a small, lightweight, coin-shaped battery (primary battery) for a drive power source. Also, to achieve a lighter viewing device, it is under study to use a laminated battery as a drive power source since laminated batteries can be rendered thinner more easily than coin-shaped batteries.

Furthermore, attention is drawn by a technology in which eyeglass lenses include electroactive elements made of liquid crystals. Current to be applied to the electroactive elements is adjusted to instantaneously change the lenses' diopter (refractive power) or focal point (see Patent Literatures 3, 4, and 5). This technology makes it possible to achieve eyeglasses (referred to below as variable focus eyeglasses) in which the diopter of myopia correction eyeglass lenses can be partially changed to a diopter for hyperopia correction as necessary or the diopter for approximately the entire eyeglass lenses can be switched between diopters for myopia correction and hyperopia correction as necessary. This makes it possible to achieve a satisfactory field of view without distortion when compared to general, so-called bifocal eyeglasses or suchlike.

CITATION LIST

Patent Literatures

Patent Literature 1: Japanese Laid-Open Patent Publication No. 2010-022067
Patent Literature 2: Japanese Laid-Open Patent Publication No. 2010-020898
Patent Literature 3: Japanese PCT National Phase Laid-Open Patent Publication No. 2010-517082
Patent Literature 4: Japanese PCT National Phase Laid-Open Patent Publication No. 2009-540386
Patent Literature 5: Japanese PCT National Phase Laid-Open Patent Publication No. 2010-522903

SUMMARY OF INVENTION

Technical Problem

As described above, so-called 3D eyeglasses often include batteries (secondary batteries) as power sources for driving liquid crystal shutters. In addition, variable focus eyeglasses are planned to include batteries to obtain current to be applied to liquid crystal materials. However, as with normal eyeglasses, these devices are intended to be worn on the head with their weight supported on the nose and the ears. Accordingly, a significant increase in weight due to inclusion of liquid crystal shutters and a battery seriously compromises the comfort of wearing.

To prevent such an increase in the weight of a device with a built-in battery, it is effective to reduce the weight of the battery to be included. However, a reduction in the battery weight results in a reduction in capacity. Particularly as for the secondary battery, a reduction in capacity often causes the battery to be discharged completely or almost completely (both of such states will be collectively and simply referred to below by being discharged completely) by using the device for a long period of time. The cycle life of the secondary battery varies in accordance with the depth of discharge. The more times it is discharged completely, the shorter the cycle life becomes.

As a result, it is conceivable that the life of the secondary battery ends in about one to two years, for example. Upon such occurrence, if the battery is provided in an embedded form, 3D eyeglasses or variable focus eyeglasses conceivably might need to be replaced in one to two years. At present, variable focus eyeglasses are expected to be more expensive than normal eyeglasses. Accordingly, the need for replacement by purchase within such a short period of time would not be preferable for users. On the other hand, the replacement cycle of televisions is generally said to be seven to eight years. Accordingly, if the battery life is one to two years, only the 3D eyeglasses need to be replaced a few times before the television is replaced by purchase. It is very cumbersome for users to order accessories of electronic devices, and therefore it is desirable to approximate the life of batteries as close to the replacement cycle of televisions or such like as possible.

Therefore, an objective of the present invention is to achieve appropriate use of a secondary battery, thereby prolonging the life of a head-worn optical device with optical components electrically actuated such that light transmission states are variable.

Solution to Problem

The present invention is directed to an optical device including:
at least one optical component configured to be electrically actuated such that a light transmission state is variable;
a driver circuit for the at least one optical component;
a power source unit for driving the at least one optical component;
a pair of rims;
a pair of temples having front and rear ends and connected at the front ends to their respective rims; and
a pair of earpieces formed at the rear ends of their respective temples,
the at least one optical component being supported by at least one of the rims,
the power source unit including:
a secondary battery;
a power switch;
a power switch control portion; and
a use-status sensing portion for sensing the status of use by a user of the optical device, and
the power switch control portion performing control to turn off the power switch when the use-status sensing portion does not sense use by the user of the optical device.

For example, the present invention is directed to an eyewear-like stereoscopic image viewing device including:
a right-eye light shutter;
a left-eye light shutter;
a driver circuit for the light shutters;
a power source unit for driving the light shutters;
rims for supporting the light shutters;
temples having front and rear ends, and connected at the front ends to the rims; and
earpieces formed at the rear ends of the temples,
the power source unit including:
a secondary battery;
a power switch;
a power switch control portion; and
a use-status sensing portion for sensing the status of use by a user of the stereoscopic image viewing device, and
when the power switch is on and the use-status sensing portion does not sense any use by the user of the stereoscopic image viewing device, the power switch control portion turning off the power switch.

Advantageous Effects of Invention

In the present invention, in the case where the power switch is on (power-on) when the optical device is not in use by the user, the power switch is automatically turned off (turn-off). Accordingly, even if the secondary battery is lightweight and has a small capacity, the number of times the battery is discharged completely decreases. Thus, it is possible to prolong the life of the secondary battery or even the optical device.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
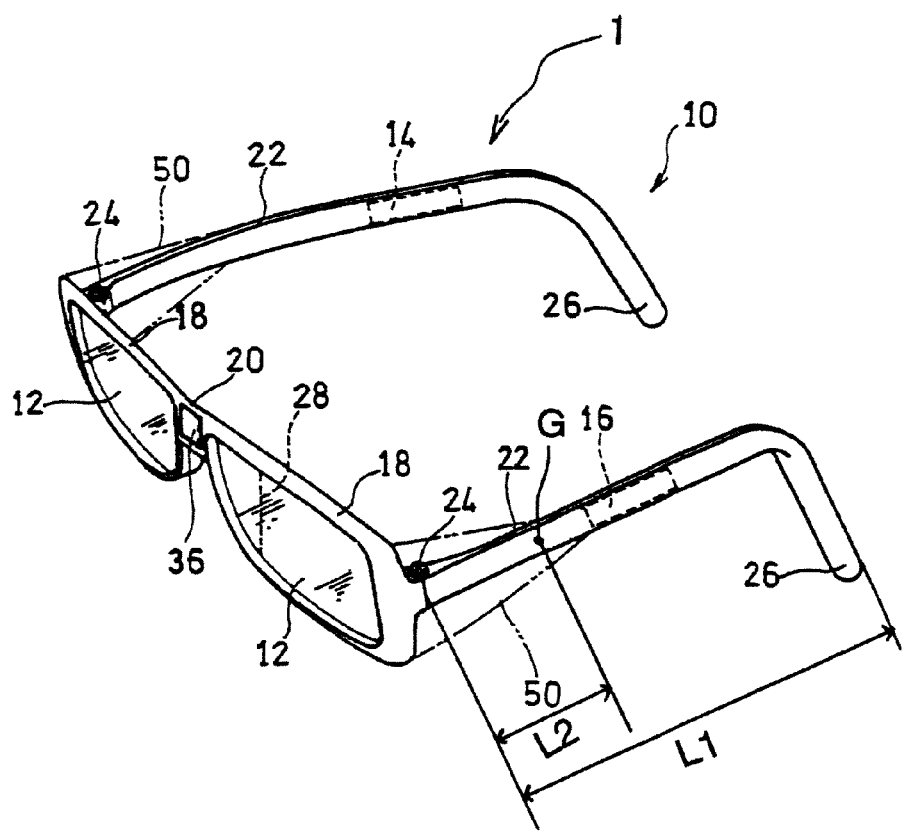
FIG. 1 is an oblique view illustrating the appearance of a stereoscopic image viewing device as an optical device according to an embodiment of the present invention.

The present invention is directed to an optical device including:
at least one optical component configured to be electrically actuated such that a light transmission state is variable;
a driver circuit for the at least one optical component;
a power source unit for driving the at least one optical component;
a pair of rims;
a pair of temples having front and rear ends and connected at the front ends to their respective rims; and
earpieces formed at the rear ends of the temples.
The at least one optical component is supported by at least one of the rims.
The power source unit includes a secondary battery, a power switch, a power switch control portion, a charge/discharge circuit for controlling charge and discharge of the secondary battery, and a use-status sensing portion for sensing the status of use by a user of the optical device.
When the use-status sensing portion does not sense any use by the user of the optical device, if the power switch is on, for example, the power switch control portion performs control to turn off the power switch.

An example of the optical device is an eyewear-like stereoscopic image viewing device generally called 3D eyeglasses or 3D glasses. Among such stereoscopic image viewing devices, stereoscopic image viewing devices (also simply referred to below as viewing devices) particularly compatible with active shutter system include liquid-crystal light shutters and power source units or such like for driving the shutters, and therefore are heavier compared to normal eyeglasses. Therefore, at present, users often feel uncomfortable in wearing the viewing devices.

The secondary battery is used in place of a conventional primary battery, as a battery for use in the power source unit, thereby eliminating the need for battery replacement, and the secondary battery can be reduced in size and weight, thereby improving the comfort of wearing the viewing device.

However, when the secondary battery is reduced in size and weight, the battery's capacity decreases, which increases the frequency of the battery being discharged completely or almost completely (this state will be referred to below simply by being completely discharged). The cycle life of the secondary battery varies in accordance with the depth of discharge, and the more times it is discharged completely, the shorter the cycle life becomes.

Therefore, there is a need to reduce as much as possible the case where the secondary battery is discharged completely. Possible causes of the secondary battery being discharged completely include the case where the viewing device is continuously used for a long period of time without any interruption for recharge and the case where the device is left with the power switch on. In the latter case, the secondary battery is discharged in vain.

For example, when the power switch is on and the use-status sensing portion does not sense any use by the user of the optical device, the viewing device of the present invention is left with the power switch on, and therefore the power switch control portion performs control to automatically turn off the power switch. Thus, the number of times the secondary battery is discharged completely can be reduced as much as possible.

As a result, the life of the secondary battery can be prolonged, thereby extending the cycle of replacing the secondary battery. Thus, in the case where the secondary battery is provided so as not to be replaceable, such as the secondary battery being embedded in the viewing device's frame or suchlike, the cycle of replacing the viewing device itself can be extended.

The foregoing is not limited to so-called 3D eyeglasses, and generally applies to optical devices designed to be worn on the head (or the face) and including optical components configured to be electrically actuated such that light transmission states are variable. Such optical devices often include secondary batteries as power sources for driving optical components. Accordingly, they share the same challenge of reducing the weight of secondary batteries to be included and preventing the life of the secondary batteries from being shortened due to such reduction in weight.

In an aspect of the present invention, the use-status sensing portion of the optical device includes a first sensing portion for sensing the optical device being worn by the user. When the first sensing portion does not sense the optical device being worn by the user, if the power switch is on, for example, the power switch control portion turns off the power switch.

Here, the first sensing portion can be configured to include a pyroelectric sensor. The pyroelectric sensor may be provided in a given place of the optical device where infrared radiation from the human body can be sensed. For example, the pyroelectric sensor is provided so as to contact the skin of the user wearing the optical device, making it possible to sense the optical device being or not being worn by the user with high accuracy.

Furthermore, the first sensing portion can be configured to include a capacitive sensor. For example, the capacitive sensor is provided in a portion of the optical device so as to contact the skin of the user wearing the optical device, making it possible to sense the optical device being or not being worn by the user.

In another aspect of the present invention, the optical device has the temples connected to their respective rims via hinges. In addition, biasing means biases at least one of the temples such that an angular position of the at least one of the temples about the hinge coincides with a predetermined angular position corresponding to the optical device's status of not being in use. As the biasing means, an elastic member such as a spring or rubber can preferably be used. The use-status sensing portion includes a second sensing portion for sensing the angular position of the at least one of the temples to coincide with the predetermined angular position. When the second sensing portion senses the angular position of the at least one of the temples to coincide with the predetermined angular position, if the power switch is on, for example, the power switch control portion turns off the power switch. Here, the predetermined angular position corresponding to the optical device's status of not being in use refers to an angular position in which the temple is folded about the hinge, for example.

With the above configuration, when the optical device is not worn by the user, the biasing force of the biasing means causes the at least one of the temples to pivot to the predetermined angular position. In this case, if the power switch is on, the power switch control portion automatically turns off the power switch. Thus, a similar effect to that described above can be achieved.

In still another aspect of the present invention, the optical device includes a reception portion for a signal related to driving of the at least one optical component. The use-status sensing portion includes a third sensing portion for sensing whether or not the reception portion is receiving the signal. When the third sensing portion does not sense the reception portion receiving the signal, if the power switch is on, for example, the power switch control portion turns off the power switch.

In the active shutter system, a 3D-image display device (such as a 3D television) normally transmits a drive signal (synchronization signal) specifying the timing of opening/closing the light shutters of the viewing device. Accordingly, when the reception portion of the viewing device does not receive the drive signal, the display device does not display 3D images. In such a case, the power switch is automatically turned off, thereby preventing the secondary battery from being discharged completely in vain.

In yet another aspect of the present invention, the power source unit of the optical device includes a secondary battery with a small capacity of 10 mAh to 100 mAh. Such a small-capacity secondary battery is prone to be discharged completely with the power switch left on. Therefore, the present invention is advantageous particularly in such a case. In view of this, when the power source unit includes a secondary battery with a smaller capacity of 10 mAh to 50 mAh for the purpose of weight reduction, the need to apply the present invention is further increased.

In yet another aspect of the present invention, the secondary battery of the optical device has a diameter or breadth of 2 mm to 6 mm. By providing the secondary battery in such an elongated cylindrical or rectangular shape, it is rendered possible for the secondary battery to be readily built in the temple or suchlike. As a result, the flexibility to arrange the secondary battery can be enhanced. In general, cylindrical or rectangular batteries include metal can casings. In addition, these shapes are resistant to an increase in internal pressure, and therefore a large amount of material can be accommodated even in a small volume. Moreover, high resistance to external force provides suitability for inclusion in flexible portions of the optical device, such as temples and earpieces. Here, the term "rectangular" encompasses shapes where the cross section is elliptical or the cross section includes a pair of straight segments and has arc-like portions on opposite sides. Herein, the breadth of the rectangular secondary battery refers to the length of the major axis of the cross section.

The secondary battery is preferably included near the rear end of one of the pair of temples or in one of the pair of earpieces. As a result, weight balance of the optical device in which relatively heavy lenses, liquid-crystal light shutters, etc., are arranged on the front side can be shifted to the rear side. Thus, the comfort of wearing the optical device can be enhanced. In this case, for each of the temples, distance $L_2$ between the front end of the temple and center of gravity G of the entire viewing device along a direction in which the temple extends is preferably 15% to 50% of distance $L_1$ between the front end of the temple and the rear end of the earpiece along the direction in which the temple extends. As a result, the comfort of wearing can be remarkably improved. A more preferable range is from 20% to 35%. Note that the direction in which the temple extends refers to the direction of the temple in its unfolded state.

As described above, the optical components of the present invention are, by way of example, liquid-crystal light shutters for viewing 3D images. In this case, the driver circuit drives the liquid-crystal light shutters in synchronization with switching between two types of images, i.e., right-eye and left-eye images, alternatingly displayed on an external image display device. More specifically, the driver circuit applies a variable voltage to each of the liquid-crystal light shutters in synchronization with switching between two types of images alternatingly displayed on an external image display device, such that when one of the liquid-crystal light shutters has high transparency, the other has low transparency, and when one liquid crystal light shutter has low transparency, the other has high transparency.

In another example, each of the optical components of the present invention includes an electroactive material whose refractive index varies upon activation through application of a voltage greater than or equal to a predetermined value. In this case, the driver circuit activates the electroactive material by applying the voltage greater than or equal to the predetermined value to the electroactive material under a predetermined condition. Here, for example, the predetermined condition refers to an instruction provided by the user's button operation or an instruction from a sensor means for sensing the user's predetermined action (e.g., the action of lowering the head). As the electroactive material, a cholesteric liquid crystal material can be used, for example.

Embodiment 1

Hereinafter, a more specific embodiment of the present invention will be described with reference to the drawings.

Figure 2:
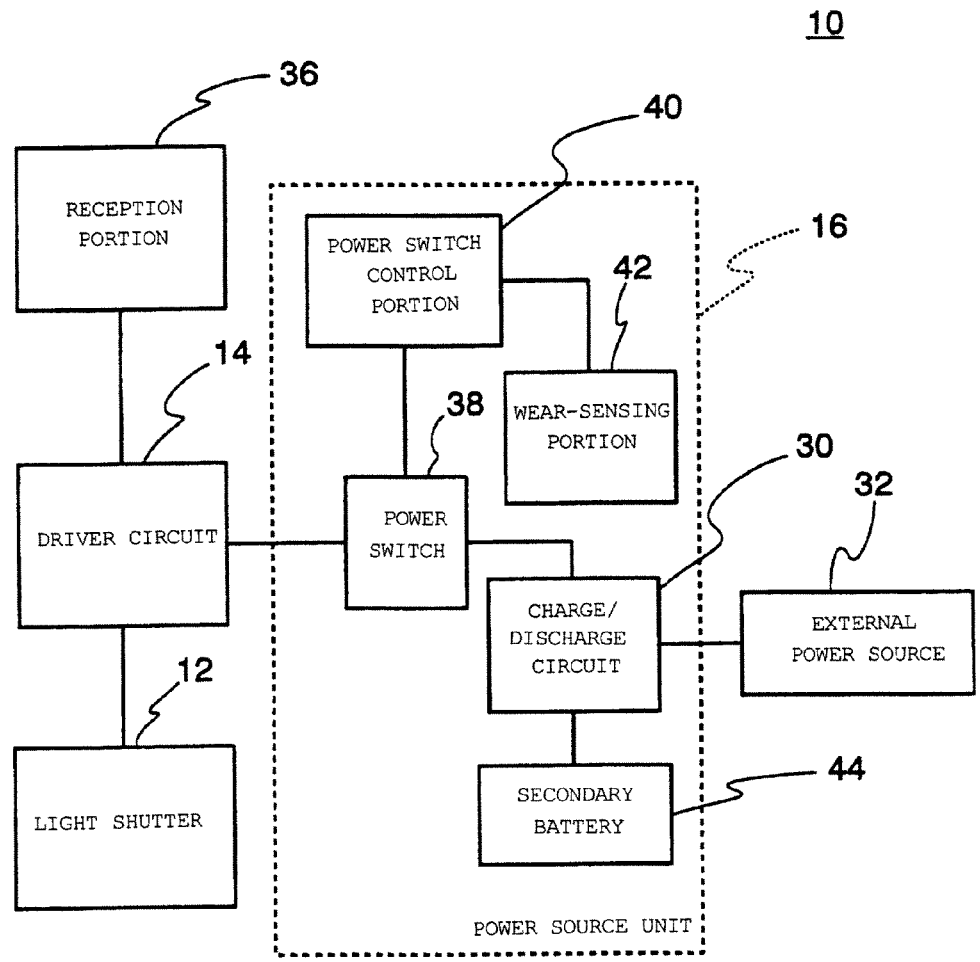
FIG. 2 is a functional block diagram of the stereoscopic image viewing device in FIG. 1.

FIG. 1 is an oblique view of a stereoscopic image viewing device as an optical device according to Embodiment 1 of the present invention. FIG. 2 shows a functional block diagram of the stereoscopic image viewing device.

The stereoscopic image viewing device (referred to below as the viewing device) 10 is an eyewear-like viewing device compatible with an active-shutter stereoscopic image viewing system.

The active-shutter stereoscopic image viewing system is a system for viewing stereoscopic images in which right-eye and left-eye images are displayed on a display device such as a 3D television while being alternatingly switched at high speed, and light shutters of the viewing device 10 are alternatingly opened/closed in synchronization with the switching of images on the display device.

In the viewing device 10, right-eye and left-eye light shutters 12 have unillustrated electrodes connected to a driver circuit 14, which is in turn connected to a power source unit 16 for driving the light shutters 12. The power source unit 16 includes a secondary battery 44, a charge/discharge circuit 30 for controlling charge and discharge of the secondary battery 44, a power switch 38, a power switch control portion 40, and a wear-sensing portion 42 for sensing the viewing device 10 being worn by a user. Details of the power switch control portion 40 and the wear-sensing portion 42 will be described later.

The charge/discharge circuit 30 is connected to the driver circuit 14 via the power switch 38. The power switch 38 is connected to the power switch control portion 40, which is in turn connected to the wear-sensing portion 42. The charge/discharge circuit 30 is connected to the secondary battery 44, and can be connected to an external power source 32 such as a commercial power source.

The light shutters 12 are held by a pair of rims 18, respectively. The pair of rims 18 are connected at their inside edges to each other via a bridge 20. Each of the rims 18 is pivotably connected at its outside edge to the front end of a temple 22 via a hinge 24. The temple 22 has an earpiece 26 formed at the rear end. Each rim 18 has a nose pad 28 formed near the bridge 20. The pair of rims 18, the bridge 20, the temples 22, the hinges 24, the earpieces 26, and the nose pads 28 constitute a frame 1.

The unillustrated display device (such as a 3D television) transmits a synchronization signal such as infrared (the signal being related to driving of optical components), which specifies the timing of opening and closing the light shutters 12. On the other hand, the bridge 20 is provided with a reception portion 36 for receiving the synchronization signal. The reception portion 36 transmits the signal related to the timing of opening/closing the light shutters 12 to the driver circuit 14 on the basis of the received synchronization signal.

As the light shutters 12, liquid-crystal light shutters are preferably used from the viewpoint of operation speed and quietness. Liquid-crystal light shutters operate so as to become transparent upon voltage application and opaque upon cessation of voltage application.

Figure 3:
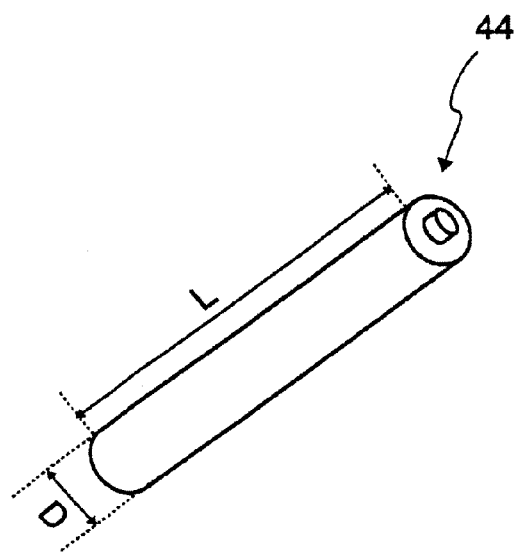
FIG. 3 is an oblique view illustrating the appearance of a secondary battery.

FIG. 3 is an oblique view of the appearance of a secondary battery. The secondary battery 44 has an elongated shape of 2 mm to 6 mm in diameter or width D and 15 mm to 35 mm in length L. As the secondary battery 44, a non-aqueous electrolyte secondary battery, in particular, a lithium-ion secondary battery, is preferably used in view of high energy density. Note that the secondary battery 44 is not limited to a cylindrical shape as shown in the figure, and secondary batteries of various shapes such as a rectangular shape can be used. In general, cylindrical or rectangular batteries include metal can casings. In addition, the term "rectangular" refers to a shape corresponding to a rectangular battery as it is called in the field of battery, and the tube portion has at least a pair of parallel planes. The rectangular shape encompasses a thin flat shape with rounded edges. Moreover, the width of a rectangular secondary battery refers to the greater of the widths where there are narrow and wide widths.

The secondary battery 44 is sized and shaped as mentioned above so that it can be disposed near the rear end of the temple 22 or in the earpiece 26 without sacrificing design.

Here, setting the secondary battery 44 to be 2 mm or more in diameter D facilitates easy manufacturing of the secondary battery 44 compared to the case where diameter D is smaller, resulting in reduced production cost. Moreover, it is ensured that the secondary battery 44 can have a satisfactory capacity. On the other hand, the reason for the secondary battery 44 to be 6 mm or less in diameter D is to dispose the secondary battery 44 at the rear of the viewing device more readily without compromising design when compared to the case where diameter D is greater.

Furthermore, using a secondary battery in the power source unit 16 eliminates the need to frequently change the battery, resulting in easier use of the viewing device 10. The capacity of the secondary battery 44 can be in the range from 10 mAh to 100 mAh, for example. The present invention produces a remarkable effect particularly in the case where the secondary battery 44 with such a small capacity is used. In the case where the capacity of the secondary battery 44 is in the range from 10 mAh to 50 mAh, the need to apply the present invention is higher.

As shown in FIG. 1, the viewing device 10 as illustrated has the driver circuit 14 disposed near the rear end of the right temple 22 (on the depth side of the figure) and the power source unit 16 disposed near the rear end of the left temple 22 (on the front side of the figure). The arrangement of the components is not limited to this, and at least one or all of the constituent elements of the power source unit 16 and the driver circuit 14 can be disposed at the left and right earpieces 26.

In an example, the power source unit 16 can be disposed in the earpiece 26 which is positioned further rearward from the above rear end position of the left temple 22, in order to achieve a right-left weight balance with the driver circuit 14, which is relatively heavy. To allow such weight balance to be distributed near the rear as much as possible, all of the constituent elements of the power source unit 16 and the driver circuit 14 may be disposed in the earpieces 26.

Here, it is not requisite to dispose the driver circuit 14 and the power source unit 16 entirely near the rear ends of the temples 22 or in the earpieces 26, and the driver circuit 14 and the power source unit 16 can be disposed in part (e.g., the charge/discharge circuit) near the front ends of the temples 22 or in the rims. However, the secondary battery 44 and the driver circuit 14 are relatively heavy and therefore preferably provided near the rear ends of the temples 22 or in the earpieces 26.

In this case, the driver circuit 14 and the power source unit 16 are desirably positioned such that, where the distance between the front end of the temple 22 (e.g., the center point on the shaft of the hinge 24) and the tip of the earpiece 26 (the distance along the direction in which the temple extends) is taken as 100%, the center of gravity of the viewing device 10 is positioned at a distance of 15% to 50% from the front end of the temple 22. When the center of gravity of the viewing device 10 is within the above range, the comfort of wearing the viewing device 10 is good.

Figure 4:
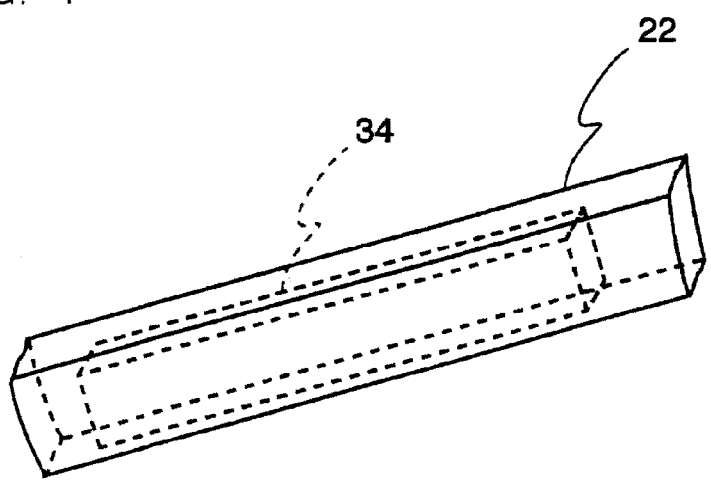
FIG. 4 is an enlarged perspective view of a temple, schematically illustrating the configuration of a housing portion for a power source unit and a driver circuit.

FIG. 4 illustrates an exemplary housing portion for accommodating the driver circuit and the power source unit. The housing portion 34 is formed as a hollow portion provided in each of the right and left temples 22, to accommodate the driver circuit 14 and the power source unit 16 within the temples 22. The housing portion 34 can be provided with a lid that can be opened and closed.

The shape of the housing portion 34 is not limited to a rectangular shape as shown in the figure, and if the cross section of the temple 22 is rounded, the housing portion 34 can be cylindrical or suchlike correspondingly. The size of the housing portion 34 is appropriately set in accordance with the size of a target to be accommodated therein. Alternatively, the housing portion 34 may be provided in the earpiece 26.

The housing portion 34 is formed as a hollow portion provided in each of the temples 22 or the earpieces 26, so that portions of the driver circuit 14 and the power source unit 16, in particular the secondary battery 44, the size of which is relatively difficult to reduce, can be accommodated within the temples 22 or the earpieces 26 without causing the user to be aware of their presence. This broadens the choice of designs of the viewing device 10, making it easy to improve the appearance.

Furthermore, since the power source unit 16 uses the secondary battery 44 in place of a conventional primary battery, there is less need to change the battery. Therefore, the power source unit 16 and the driver circuit 14 may be built in the temples 22 or the earpieces 26 through embedding by insert molding if the temples 22 or the earpieces 26 are made of resin. This increases the flexibility in designing the viewing device.

Next, the power switch control portion 40 and the wear-sensing portion 42 will be described in detail.

When the power switch 38 is on, i.e., the driver circuit 14 and the charge/discharge circuit 30 are electrically connected to each other, and the wear-sensing portion 42 does not sense the viewing device 10 being worn by a user, the power switch control portion 40 operates to turn off the power switch 38. The power switch control portion 40 thus operating can be configured by a CPU (central processing unit) or an MPU (micro-processing unit), memory, and so on.

The wear-sensing portion 42 can be configured by a pyroelectric sensor. The pyroelectric sensor is provided in, for example, a portion of the temple 22, the nose pad 28, or the earpiece 26 that touches the user's skin. The wear-sensing portion 42 senses the viewing device 10 to be worn by the user when the temperature detected by the pyroelectric sensor is greater than or equal to a reference value (e.g., 34° C.)

Alternatively, the wear-sensing portion 42 can be configured by a capacitive sensor. The capacitive sensor is provided in, for example, a portion of the temple 22, the nose pad 28, or the earpiece 26 that touches the user's skin. When the capacitance detected by the capacitive sensor changes by a prescribed value (absolute value) or more, the wear-sensing portion 42 senses whether or not the viewing device 10 is being worn by the user, on the basis of the direction of the change (either positive or negative).

Hereinafter, the operation of the power switch control portion 40 will be described with reference to a flowchart of FIG. 5.

First, when the power switch 38 is turned on, a standby of a first predetermined period (e.g., 30 seconds) is taken (step S1). Thereafter, upon completion of the standby of the first predetermined period, it is determined whether or not the wear-sensing portion 42 has sensed the viewing device 10 being worn by a user (step S2). When the result of determination is affirmative (Yes), a standby of a second predetermined period (e.g., 5 seconds) is taken (step S3). Upon completion of the standby, step S2 is performed again. Steps S2 and S3 will be repeated until the result of determination in step S2 turns negative (No). The first predetermined period is set considering the time between the user turning on the power switch 38 and actually wearing the viewing device.

The second predetermined period is set such that the determination is not performed very frequently.

On the other hand, when the result of determination in step S2 is negative (No), a standby of a third predetermined period (e.g., 30 seconds) is taken (step S4). Upon completion of the standby, it is determined again whether the wear-sensing portion 42 has sensed the viewing device 10 being worn by a user (step S5). The third predetermined period is set for the purpose of avoiding the viewing device being turned off instantly every time the user takes off the viewing device at the time of 3D-image viewing.

When the result of determination in step S5 is affirmative (Yes), a standby of the second predetermined period (e.g., 5 seconds) is taken (step S3), and step S2 is performed again thereafter. On the other hand, when the result of determination in step S5 is negative (No), the power switch 38 is turned off (step S6), thereby ending the process.

When the power switch 38 is on and the wear device 42 does not sense the viewing device 10 being worn by a user, the power switch 38 is automatically turned off through the above process. Thus, the secondary battery 44 is prevented from being discharged completely in vain, thereby prolonging the life of the secondary battery 44 or even the viewing device 10.

Embodiment 2

Next, Embodiment 2 of the present invention will be described.

The viewing device of Embodiment 2 is similar in appearance and circuit configuration to that of Embodiment 1, and therefore will be described using the same reference characters as in FIGS. 1 and 2.

Figure 6:
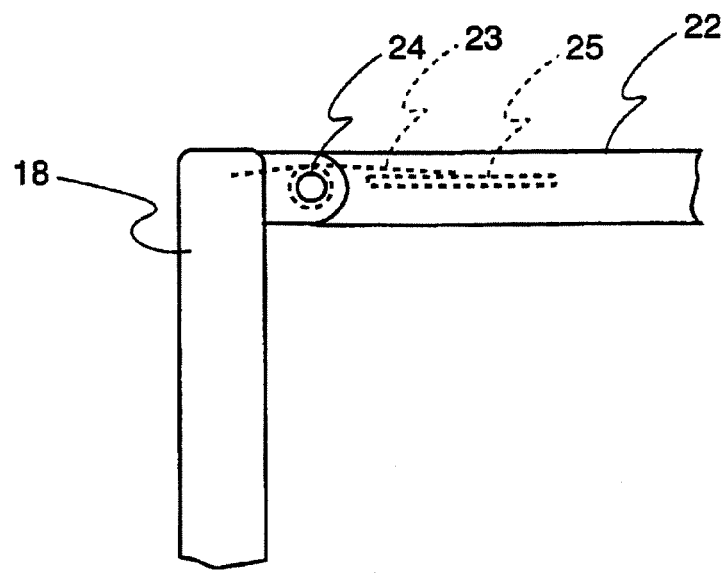
FIG. 6 is a top view of a stereoscopic image viewing device as an optical device according to another embodiment of the present invention, where principal portions of the stereoscopic image viewing device are schematically enlarged in a given state.
Figure 7:
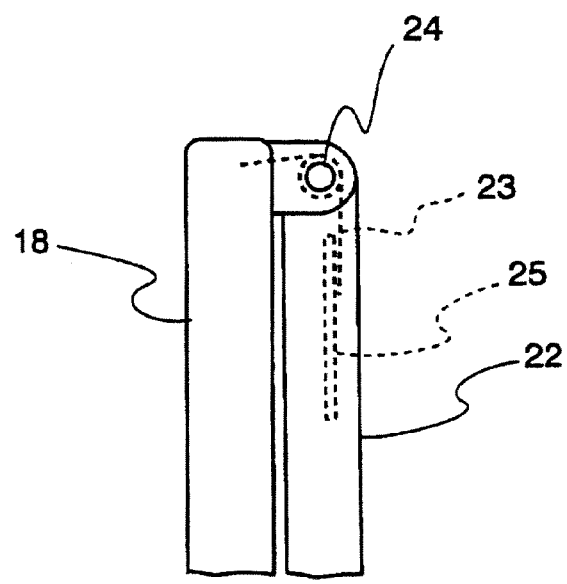
FIG. 7 is a top view of the stereoscopic image viewing device as the optical device according to said another embodiment of the present invention, where the principal portions of the stereoscopic image viewing device are schematically enlarged in another state.

FIGS. 6 and 7 schematically illustrate feature portions of Embodiment 2 in enlargement. In Embodiment 2, each of the right and left hinges 24 is provided with biasing means for biasing the temple 22 in a folding direction (e.g., a helical spring 23 or an elastic member such as a flat spring or rubber). In addition, a film-like piezoelectric sensor (piezo film) 25 is provided near at least one of the hinges 24. In this case, the film is arranged such that the pressure applied to the piezoelectric sensor 23 when the temple 22 is folded (FIG. 7) is lower than the pressure applied to the piezoelectric sensor 23 when the temple 22 is not folded (FIG. 6).

In the configuration described above, when the temples 22 are not folded, the viewing device is considered as being worn by the user. Moreover, in this case, there is a greater difference in potential between terminals of the piezoelectric sensor. On the other hand, when the temples 22 are folded, the viewing device is not considered as being worn by the user. Moreover, in this case, there is only a slight difference in potential between the terminals of the piezoelectric sensor. Thus, when the difference in potential between the terminals of the piezoelectric sensor is greater than a predetermined value, the viewing device is sensed as being worn by the user, whereas when the difference in potential between the terminals of the piezoelectric sensor is less than the predetermined value, the viewing device is sensed as not being worn by the user. That is, in Embodiment 2, the piezoelectric sensor functions as a wear-sensing portion.

Figure 5:
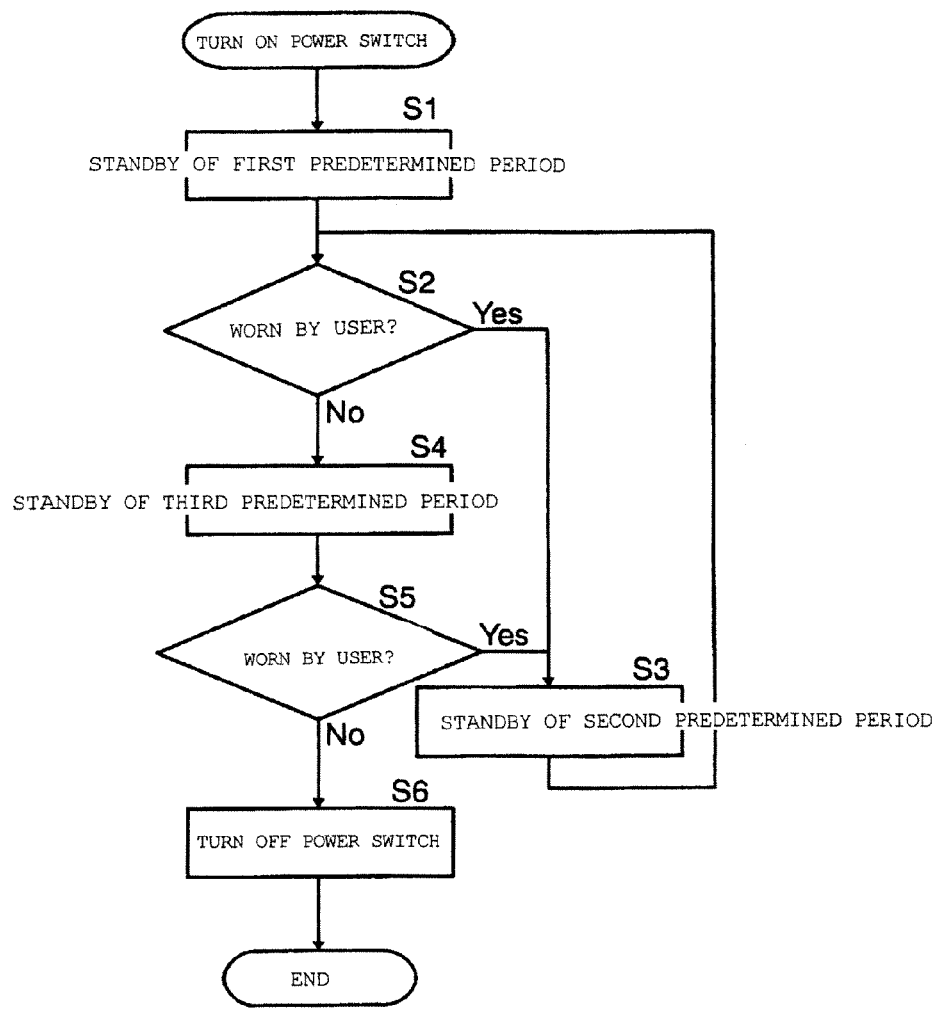
FIG. 5 is a flowchart showing the operation of a power switch control portion in the stereoscopic image viewing device of FIG. 1.

Therefore, it is possible to achieve a similar effect to that achieved by Embodiment 1 through a process similar to that shown in FIG. 5. Note that the configuration for sensing whether the temples 22 are folded or not is not limited to the above. For example, electrodes may be attached to the temples 22 or the earpieces 26, and also to the rims 18 so as to contact each other when the temples 22 are folded, and the temples 22 may be determined to be folded when the electrodes can be electrically connected to each other.

Embodiment 3

Next, Embodiment 3 of the present invention will be described.

The viewing device of Embodiment 3 is similar in appearance to that of Embodiment 1, and therefore will be described using the same reference characters as in FIG. 1.

Figure 8:
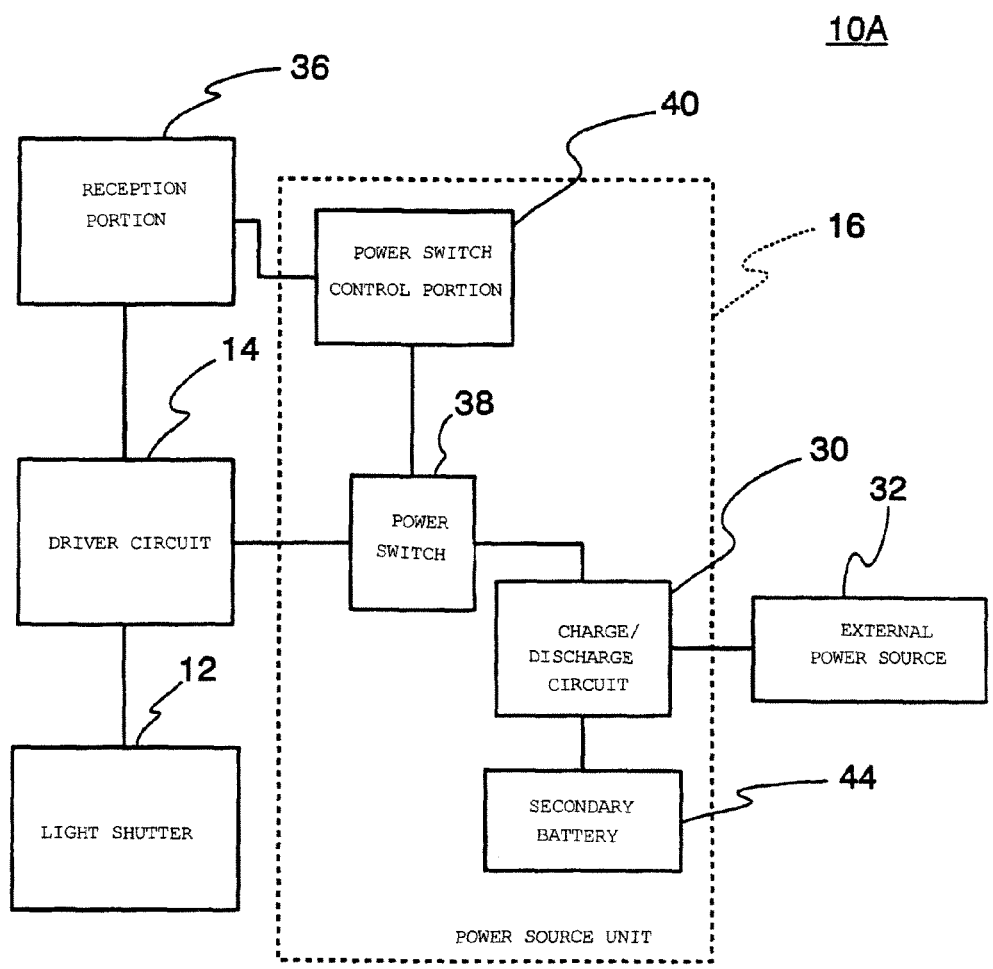
FIG. 8 is a functional block diagram of a stereoscopic image viewing device as an optical device according to still another embodiment of the present invention.

FIG. 8 illustrates a functional block diagram of the viewing device of Embodiment 3. In the viewing device 10A, the reception portion 36 is connected to the power switch control portion 40, and the wear-sensing portion 42 is omitted from the power source unit 16A.

When the reception portion 36 receives a synchronization signal, and outputs a signal based on the synchronization signal to the power switch control portion 40, 3D images are presented on the display device. Accordingly, while the reception portion 36 is outputting a signal based on a received synchronization signal, the viewing device 10A is considered as being in use by a user. On the other hand, while the reception portion 36 is not outputting a signal based on a received synchronization signal, no 3D images are presented on the display device, and therefore the viewing device 10A is not considered as being in use by a user. That is, in Embodiment 3, the reception portion 36 functions as a use-status sensing portion.

Furthermore, when the power switch 38 is on and the reception portion 36 is not receiving a synchronization signal, i.e., the reception portion 36 is not sensing the viewing device 10A being in use by the user, the power switch control portion 40 operates to turn off the power switch 38.

Figure 9:
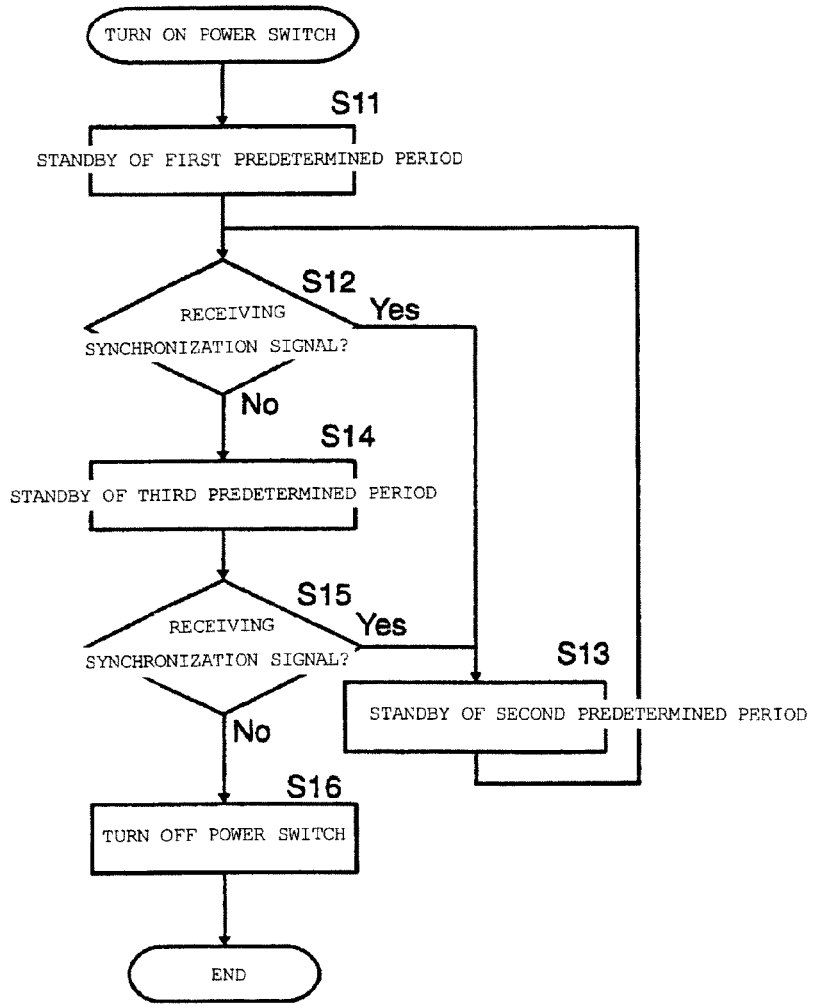
FIG. 9 is a flowchart showing the operation of a power switch control portion in the stereoscopic image viewing device of FIG. 6.

The operation of the power switch control portion 40 will be described below with reference to a flowchart of FIG. 9.

First, once the power switch 38 is turned on, a standby of a first predetermined period (e.g., 30 seconds) is taken (step S11). Thereafter, upon completion of the standby of the first predetermined period, it is determined whether or not the reception portion 36 is receiving a synchronization signal (step S12). When the result of determination is affirmative (Yes), a standby of a second predetermined period (e.g., 5 seconds) is taken (step S13). Upon completion of the standby, step S12 is performed again. Steps S12 and S13 will be repeated until the result of determination in step S12 turns negative (No). The first predetermined period is set considering the time between the user turning on the power switch 38 and the display device actually starting to display 3D images. The second predetermined period is set such that the determination is not performed very frequently.

On the other hand, when the result of determination in step S12 is negative (No), a standby of a third predetermined period (e.g., 3 minutes) is taken (step S14). Upon completion of the standby, it is determined again whether or not the reception portion 36 is receiving a synchronization signal (step S15). The third predetermined period is set for the purpose of avoiding the power being turned off instantly every time 3D images, such as a CM (commercial message), are displayed, for example.

When the result of determination in step S15 is affirmative (Yes), a standby of the second predetermined period (e.g., 5 seconds) is taken (step S13), and step S12 is performed again thereafter. On the other hand, when the result of determination in step S15 is negative (No), the power switch 38 is turned off (step S16), thereby ending the process.

When the power switch 38 is on and the reception portion 36 is not receiving a synchronization signal, the power switch 38 is automatically turned off through the above process. Thus, the secondary battery 44 can be prevented from being discharged completely in vain, thereby prolonging the life of the secondary battery 44 or even the viewing device 10A itself.

Embodiment 4

Next, Embodiment 4 of the present invention will be described.

Figure 10:
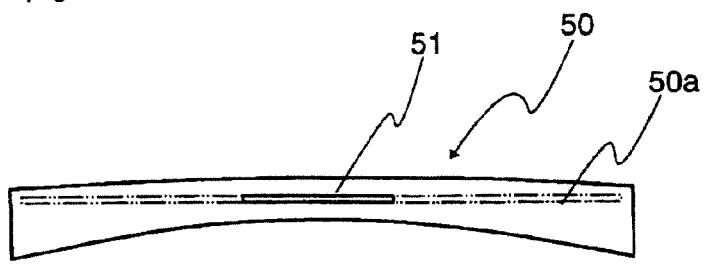
FIG. 10 is a diagram schematically illustrating a lens for use in variable focus eyeglasses as an optical device according to yet another embodiment of the present invention, as viewed from a direction perpendicular to an incident direction of light.

FIG. 10 illustrates a lens for use in variable focus eyeglasses as an optical device according to Embodiment 4, as viewed from a direction perpendicular to an incident direction of light. The appearance of the variable focus eyeglasses themselves is similar to the viewing device in FIG. 1. Accordingly, descriptions of similar portions will be given using reference characters in FIG. 1. In addition, the thickness ratio and other ratios among the portions shown in FIG. 10 are different from actualities for convenience of viewing.

The lens 50 illustrated in the figure includes a base lens 50a, and a planar electroactive element 51 embedded in the base lens 50a. For example, a normal optical lens (concave lens) for myopia correction can be used as the base lens 50a. The electroactive element 51 is a device having a refractive index variable in response to application of electrical energy. The electroactive element 51 is in optical communication with the base lens 50a. Such a lens 50 can be attached to the frame 1 (more specifically, the rim 18) in FIG. 1. Note that the electroactive element 51 can be attached to the surface of the base lens 50a, rather than in the inside.

The electroactive element 51 can be disposed across the entire or partial field of view of the lens 50. In FIG. 10, long dashed double-short dashed lines indicate the electroactive element 51 being disposed across the entire field of view of the lens 50. The electroactive element 51 can be planar as illustrated in the figure or can be bent along the curved surface of the lens. Moreover, the electroactive element 50 can be disposed in each or only one of the pair of lenses 50. Moreover, the number of electroactive elements 50 disposed in the lens 50 is not limited to one. Two or more electroactive elements 50 can be disposed in one lens 50. For example, each lens 50 can be merely transparent without a refractive power for myopia or hyperopia correction, and can have disposed therein both an electroactive element 50 that exerts a refractive power for myopia correction upon activation and an electroactive element 50 that exerts a refractive power for hyperopia correction upon activation.

When the electroactive element 51 is disposed over only a portion of the entire field of view of the lens 50, the position of the electroactive element 51 in the lens 50 is not specifically limited. In an example, the electroactive element 51 can be disposed in such a position that overlaps with the user's viewing direction when the user looks down, i.e., the electroactive element 51 can be provided in the center of a lower part of the lens 50.

Figure 11:
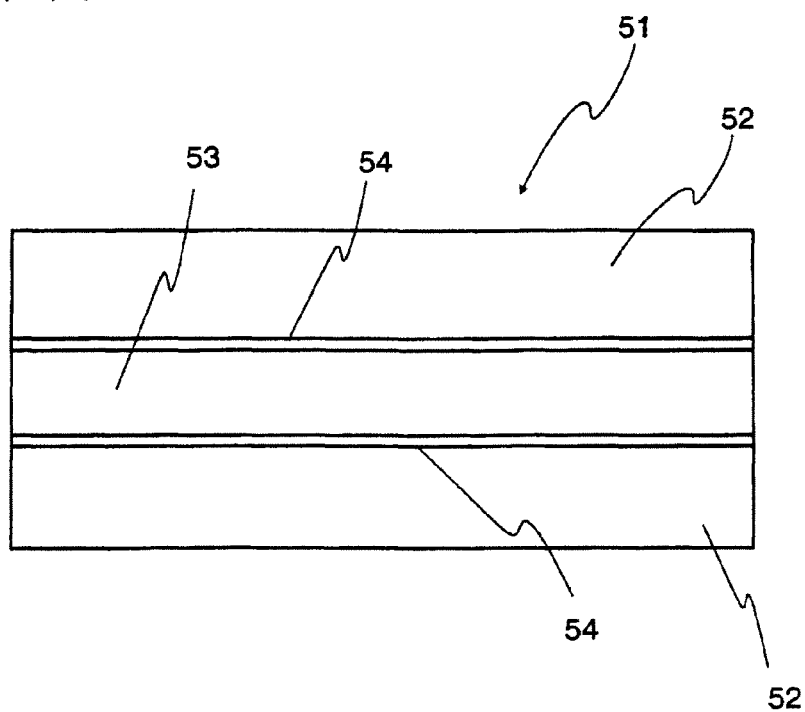
FIG. 11 is a diagram schematically illustrating a layered structure of an electroactive element for use in the variable focus eyeglasses.

FIG. 11 illustrates a cross-sectional view of an exemplary electroactive element. In this figure, the thickness to width ratio of the electroactive element 51 and the thickness ratio among the layers do not reflect actualities. In the figure, the electroactive element 51 is mainly enlarged in the thickness direction.

The electroactive element 51 illustrated in the figure includes two transparent substrates 52 and an electroactive material 53 provided therebetween and made of a thin layer of liquid crystal material. The substrates 52 are formed so as to contain the electroactive material 53 therebetween and ensure that the electroactive material 53 cannot leak therefrom. The thickness of each substrate 52 is, for example, greater than 100 μm but less than 1 mm, preferably on the order of 250 μm. The thickness of the electroactive material 53 can be, for example, less than 100 μm, preferably, less than 10 μm.

One of the two substrates 52 can form a part of the base lens 50a. In such a case, one of the substrates 52 can be essentially thicker than the other. In such a mode, the substrate that forms a part of the base lens 50a can have a thickness of on the order of 1 mm to 12 mm, for example. The other substrate 52 can have a thickness greater than 100 μm but less than 1 mm, preferably on the order of 250 μm.

The two substrates 52 can have the same refractive index. The electroactive material 53 can include liquid crystals. Liquid crystals have a refractive index variable upon generation of electric fields across the liquid crystals, and therefore are particularly suitable for the electroactive material 53. The liquid crystal material is preferably insensitive to polarized light. As the liquid crystal material, a cholesteric liquid crystal material can be appropriately used. The cholesteric liquid crystal material can include nematic liquid crystals with a birefringence of about 0.2 or more. The cholesteric liquid crystal material can further include chiral dopants with a helical twisting power of about 1.1 ($\mu m^{-1}$) or more. The electroactive material 53 can have an average refractive index approximately equal to the aforementioned refractive index.

Each substrate 52 has an optically transparent electrode 54 provided on its surface that contacts the electroactive material 53. Once the electroactive material 53 is activated through voltage application by the electrode 54, the refractive index of the electroactive material 53 changes, so that optical characteristics, such as focal distance and diffraction efficiency, of the electroactive material 53 change. The electrode 54 can include any known transparent conductive oxide (e.g., ITO (indium tin oxide) or tin-doped indium oxide) or conducting organic material (e.g., PEDOT: PSS (Poly(3,4-ethylenedioxythiophene)poly(styrenesulfonate)), carbon nanotube, or the like), for example. The thickness of the electrode 54 can be less than 1 μm, for example, preferably, less than 0.1 μm.

The electroactive element 51 can be switched between first and second refractive indices, and can have a first refractive power in an inactive state where applied voltage is less than first predetermined value $E_1$ and a second refractive power in an active state where applied voltage is greater than second predetermined value $E_2$ ($E_2 > E_1$).

The electroactive element 51 can be configured so as not to substantially exert a refractive index power in the inactive state. In other words, when a voltage of less than first predetermined value $E_1$ is applied (or when substantially no voltage is applied), the electroactive material 53 can have substantially the same refractive index as the substrate 52. In such a case, the electroactive element 51 has a substantially constant refractive index across its thickness, so that there is no change in the refractive index.

On the other hand, upon application of a sufficient voltage to cause the director of the cholesteric liquid crystal material included in the electroactive material 53 to align parallel to an electric field to be generated (the voltage exceeding second predetermined voltage $E_2$), for example, the electroactive element 51 can be in an active state so as to increase the refractive index. In other words, when a voltage exceeding second predetermined voltage $E_2$ is applied, the cholesteric liquid crystal material can have a refractive index different from the refractive index of the substrate 52.

For example, when the user is engaged in a long-distance activity such as driving a car, the electroactive element 51 is deactivated, so that the user can have appropriate correction for long distance by the base lens 50a. On the other hand, when the user is engaged in a short or middle-distance activity such as reading a book or viewing a computer screen, the electroactive element 51 is activated, so that the user can have appropriate correction for short distance.

The cholesteric liquid crystal material included in the electroactive material 53 is essentially cholesteric (i.e., chiral or twisted) or it is formed by mixing nematic liquid crystals with a chiral twist agent. In the case of the latter approach, the resultant cholesteric liquid crystals have many of the same properties as the original nematic liquid crystals. For example, the resultant cholesteric liquid crystal material can have the same refractive index dispersion. Moreover, the resultant cholesteric liquid crystal material has the same normal and abnormal refractive indices as the original nematic liquid crystals. More nematic materials are commercially available than cholesteric liquid crystals, and therefore the latter approach is preferable and offers greater design flexibility.

The variable focus eyeglasses can include a driver circuit for applying a predetermined voltage to each of the electrodes 54. The driver circuit is a similar driver circuit to the driver circuits 14 in Embodiments 1 through 3, and can operate in such a manner as to apply a predetermined voltage to each of the electrodes 54 in accordance with the user's button operation or suchlike or in accordance with a detection result for the user's predetermined action (e.g., the action of lowering the head). Such a driver circuit can be provided in the temple 22 or the earpiece 26 in the same arrangement as the driver circuits 14 in Embodiments 1 through 3.

The power conversion eyeglasses can further include a power source unit connected to the driver circuit so as to be able to control the electroactive element 51. The power source unit has similar components to those of the power source unit 16 in FIG. 2, and operates in a similar manner. Thus, in the present embodiment, as in Embodiments 1 through 3, when the power conversion eyeglasses are not sensed to be in use by the user, power supply from the driver circuit to the electroactive element 51 can be stopped. Such a power source unit can be provided in the temple 22 or the earpiece 26 in the same arrangement as the power source units 16 and 16A.

INDUSTRIAL APPLICABILITY

In the optical device of the present invention, the secondary battery serving as a power source is not discharged completely in vain, and therefore can have its life prolonged readily. Thus, it is useful for optical devices with built-in secondary batteries, such as so-called 3D eyeglasses expected to be distributed as accessories of 3D televisions and so on, and it is also useful for variable focus eyeglasses with their powers variable in accordance with electric power.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

EXPLANATION OF REFERENCE NUMERALS 10, 10A stereoscopic image viewing device
12 light shutter
14 driver circuit
16 power source unit
22 temple
26 earpiece
30 charge/discharge circuit
34 housing portion
36 reception portion
38 power switch
40 power switch control portion
42 wear-sensing portion
44 secondary battery
50 lens
51 electroactive element
53 electroactive material

The invention claimed is:

1. An optical device comprising:
at least one optical component configured to be electrically actuated such that a light transmission state is variable;
a driver circuit for the at least one optical component; a power source unit for driving the at least one optical component; a pair of rims;
a pair of temples having front and rear ends and connected at the front ends to their respective rims; and
a pair of earpieces formed at the rear ends of their respective temples, the at least one optical component being supported by at least one of the rims, the power source unit including: a secondary battery; a power switch; a power switch control portion; and a use-status sensing portion for sensing the status of use by a user of the optical device, and
the power switch control portion performing control to turn off the power switch when the use-status sensing portion does not sense any use by the user of the optical device, wherein,
the temples are connected to their respective rims via hinges, including biasing means for biasing at least one of the temples such that an angular position of the at least one of the temples about the hinge coincides with a predetermined angular position corresponding to the device's status of not being in use,
the use-status sensing portion includes a second sensing portion for sensing the angular position of the at least one of the temples to coincide with the predetermined angular position, and
the power switch control portion turns off the power switch when the second sensing portion senses the angular position of the at least one of the temples to coincide with the predetermined angular position.

2. The optical device according to claim 1, wherein,
the use-status sensing portion includes a first sensing portion for sensing the optical device to be worn by the user, and
the power switch control portion turns off the power switch when the first sensing portion does not sense the optical device being worn by the user.

3. The optical device according to claim 2, wherein the first sensing portion includes a pyroelectric sensor.

4. The optical device according to claim 2, wherein the first sensing portion includes a capacitive sensor.

5. The optical device according to claim 1, wherein the secondary battery has a capacity of 10 mAh to 100 mAh.

6. The optical device according to claim 5, wherein the secondary battery is a cylindrical secondary battery.

7. The optical device according to claim 1, wherein the secondary battery is included near the rear end of the at least one of the temples or in one of the earpieces.

8. The optical device according to claim 7, wherein, for each of the temples, a distance between the front end of the temple and a center of gravity along a direction in which the temple extends is 15% to 50% of a distance between the front end of the temple and the rear end of the earpiece along the direction in which the temple extends.

9. The optical device according to claim 1, further comprising a reception portion for a signal related to driving of the at least one optical component,
the use-status sensing portion including a third sensing portion for sensing whether or not the reception portion is receiving the signal, and
the power switch control portion turning off the power switch when the third sensing portion does not sense the reception portion receiving the signal.

10. The optical device according to claim 1, wherein,
the at least one optical component is a pair of liquid-crystal light shutters respectively supported by the rims, and
the driver circuit is configured to apply a variable voltage to each of the liquid-crystal light shutters in synchronization with switching between two types of images alternatingly displayed on an external image display device, such that when one of the liquid-crystal light shutters has high transparency, the other has low transparency, and when one liquid crystal light shutter has low transparency, the other has high transparency.

11. The optical device according to claim 1, wherein the at least one optical component includes an electroactive material whose refractive index varies upon activation through application of a voltage greater than or equal to a predetermined value, and the driver circuit activates the electroactive material by applying thereto the voltage greater than or equal to the predetermined value.

12. The optical device in accordance with claim 1, wherein the use-status sensing portion senses that the angular position of the at least one of the temples coincides with the predetermined angular position, based on the biasing force of the biasing means.

13. The optical device in accordance with claim 12, wherein the use-status sensing portion further includes a piezoelectric sensor, and the piezoelectric sensor senses the biasing force of the biasing means.

* * * * *